United States Patent
Oh et al.

(10) Patent No.: US 10,362,539 B2
(45) Date of Patent: Jul. 23, 2019

(54) METHOD AND DEVICE FOR SAVING POWER OF ELECTRONIC DEVICE IN WIRELESS COMMUNICATION SYSTEM

(71) Applicant: Samsung Electronics Co., Ltd., Gyeonggi-do (KR)

(72) Inventors: Jongho Oh, Gyeonggi-do (KR); Sanghyun Chang, Seoul (KR); Soonchan Kwon, Incheon (KR); Jungmin Yoon, Seoul (KR); Hyoungjin Lim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 46 days.

(21) Appl. No.: 15/743,485

(22) PCT Filed: Aug. 12, 2016

(86) PCT No.: PCT/KR2016/008914
§ 371 (c)(1),
(2) Date: Jan. 10, 2018

(87) PCT Pub. No.: WO2017/026851
PCT Pub. Date: Feb. 16, 2017

(65) Prior Publication Data
US 2018/0206189 A1    Jul. 19, 2018

(30) Foreign Application Priority Data
Aug. 13, 2015   (KR) .................. 10-2015-0114767

(51) Int. Cl.
*G08C 17/00*    (2006.01)
*H04W 52/02*    (2009.01)
(Continued)

(52) U.S. Cl.
CPC ....... *H04W 52/0229* (2013.01); *H04L 5/0039* (2013.01); *H04L 5/0064* (2013.01);
(Continued)

(58) Field of Classification Search
CPC .... H04L 5/0039; H04L 5/0064; H04W 52/02; H04W 52/0216; H04W 52/0229;
(Continued)

(56) References Cited

U.S. PATENT DOCUMENTS

2010/0278123 A1    11/2010   Fong et al.
2010/0284358 A1*   11/2010   Han ................. H04L 27/2613
                                                         370/329
(Continued)

FOREIGN PATENT DOCUMENTS

KR    1020100084054    7/2010
KR    101488133        2/2015
(Continued)

OTHER PUBLICATIONS

European Search Report dated Jul. 19, 2018 issued in counterpart application No. 16835491.8-1219, 6 pages.
(Continued)

*Primary Examiner* — Minh Trang T Nguyen
(74) *Attorney, Agent, or Firm* — The Farrell Law Firm, P.C.

(57) ABSTRACT

Disclosed is a 5G or pre-5G communication system to be provided so as to support a data transmission rate higher that of a 4G communication system such as LTE. According to one embodiment of the present invention, a method for receiving data in a wireless communication system by using a channel bonding scheme can comprise the steps of: monitoring reception of a preamble in a preset minimum bandwidth of the entire channel-bondable bandwidth; acquiring data transmission bandwidth information and switching interval time information from the preamble when the preamble is to be received; and receiving data by switching from the minimum bandwidth to the data transmission bandwidth for the acquired switching interval time.

20 Claims, 13 Drawing Sheets

(51) Int. Cl.
  *H04L 5/00* (2006.01)
  *H04W 72/12* (2009.01)
  *H04W 74/00* (2009.01)

(52) U.S. Cl.
  CPC ....... *H04W 52/02* (2013.01); *H04W 72/1289* (2013.01); *H04W 74/002* (2013.01); *H04W 52/0216* (2013.01); *Y02D 70/126* (2018.01); *Y02D 70/1262* (2018.01); *Y02D 70/142* (2018.01); *Y02D 70/21* (2018.01)

(58) Field of Classification Search
  CPC ............ H04W 72/1289; H04W 74/002; Y02D 70/126; Y02D 70/1262; Y02D 70/142; Y02D 70/21
  See application file for complete search history.

(56) References Cited

U.S. PATENT DOCUMENTS

| | | | | |
|---|---|---|---|---|
| 2011/0269498 | A1* | 11/2011 | Li | H04B 7/024 455/524 |
| 2011/0274074 | A1 | 11/2011 | Lee et al. | |
| 2012/0257558 | A1 | 10/2012 | Shin et al. | |
| 2013/0155868 | A1* | 6/2013 | Seo | H03M 13/3723 370/241 |
| 2015/0312088 | A1* | 10/2015 | Ramakrishnan | H04L 41/0654 370/218 |
| 2018/0368062 | A1* | 12/2018 | Koue | H04W 48/20 |

FOREIGN PATENT DOCUMENTS

| | | |
|---|---|---|
| KR | 101520663 | 5/2015 |
| WO | WO 2010/077021 | 7/2010 |

OTHER PUBLICATIONS

PCT/ISA/210 Search Report issued on PCT/KR2016/008914 (pp. 3).
PCT/ISA/237 Written Opinion issued on PCT/KR2016/008914 (pp. 4).
802.11ac: The Fifth Generation of Wi-Fi Technical White Paper—CISCO, Mar. 2014, Copyright 2014 CISCO and its affiliates, pp. 27.

* cited by examiner

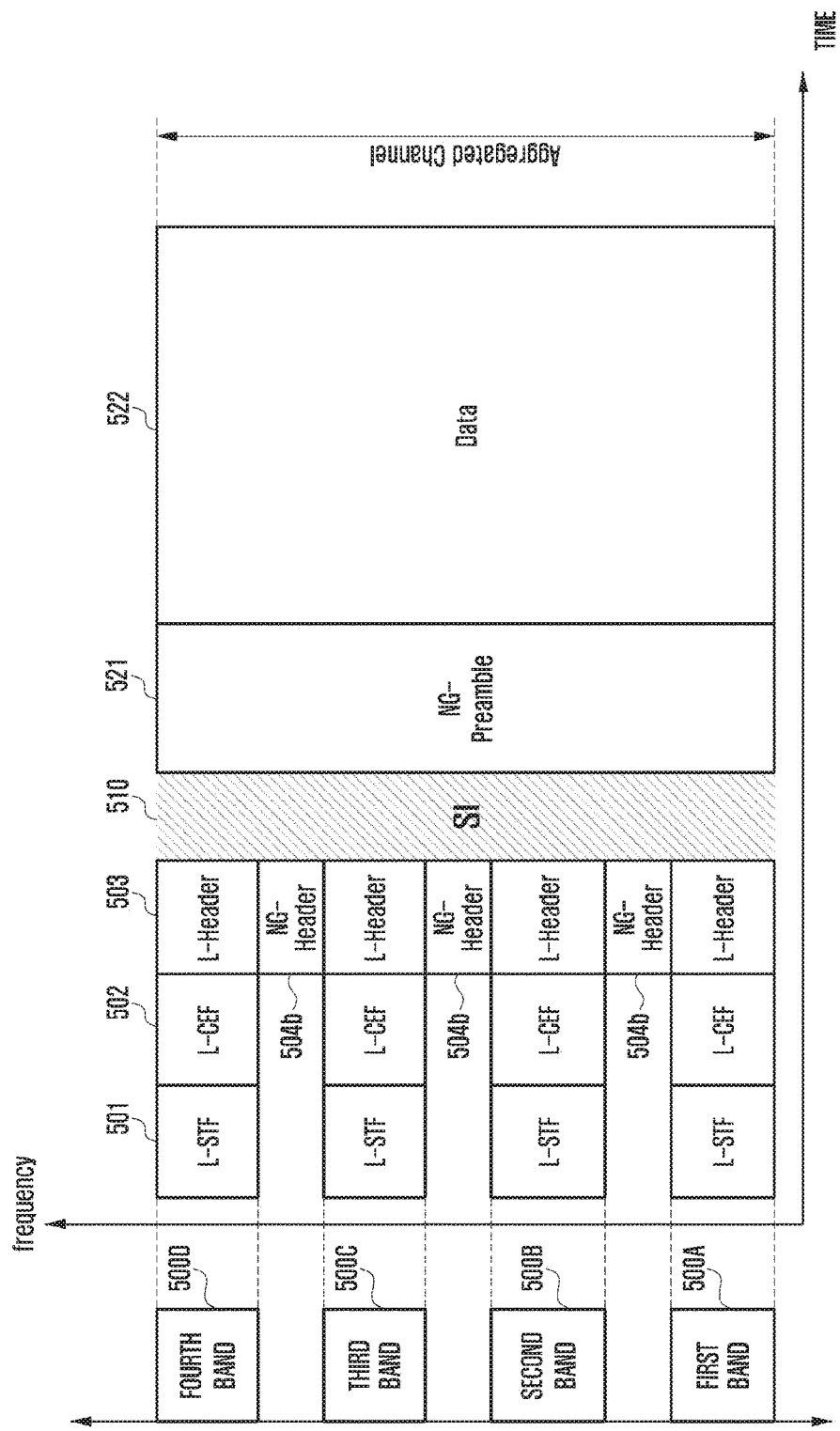

METHOD AND DEVICE FOR SAVING POWER OF ELECTRONIC DEVICE IN WIRELESS COMMUNICATION SYSTEM

PRIORITY

This application is a National Phase Entry of PCT International Application No. PCT/KR2016/008914 which was filed on Aug. 12, 2016, and claims priority to Korean Patent Application No. 10-2015-0114767, which was filed on Aug. 13, 2015, the content of each of which is incorporated herein by reference.

TECHNICAL FIELD

The present invention relates to a power saving method and apparatus of an electronic device in a wireless communication system and, in particular, to a method and apparatus for reducing power consumption of the electronic device in the idle state.

BACKGROUND ART

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system.

Consideration is being given to implementing the 5G communication system in millimeter wave (mmW) frequency bands (e.g., 60 GHz bands) to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna.

Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation.

Furthermore, the ongoing research includes the use of hybrid frequency shift keying (FSK) and quadrature amplitude modulation (QAM) and sliding window superposition coding (SWSC) as advanced coding modulation (ACM), filter bank multi-carrier (FBMC), non-orthogonal multiple access (NOMA), and sparse code multiple access (SCMA).

In line with such technical advancements, a technology called channel bonding has been introduced for high-speed data transmission in the wireless fidelity (Wi-Fi) system as one of many wireless communication systems. In the Wi-Fi communication system, the channel bonding technique is implemented in a manner such a way of combining different channels into one channel to increase a data rate. As an example, Institute of Electrical and Electronics Engineers (IEEE) 802.11ac exploits channel bonding of up to 8 20 MHz channels to achieve a bandwidth of 160 MHz, and IEEE 802.11ay standard will be designed to support a channel bonding technique. In the case of using the channel bonding technique, it is inevitable for the electronic device to experience additional power consumption.

Meanwhile, recent electronic devices have been designed with a portable and compact size. In order to achieve portability, the electronic devices are battery-powered. In this respect, battery power consumption is one of the major design issues of portable electronic devices. This is because reducing battery power consumption elongates the usage time of the portable electronic device.

As aforementioned, however, using the channel bonding technique increases power consumption of the electronic device. Reducing the consumption power of the electronic device is very important in view of energy saving as well as compact design; therefore, there is a need of a method for reducing power consumption of an electronic device supporting a channel bonding technique for high-speed data transmission.

DISCLOSURE OF INVENTION

Technical Problem

The present invention provides a method and apparatus for reducing power consumption of an electronic device in a wireless communication system.

Also, the present invention provides a method and apparatus for reducing power consumption of an electronic device in a wireless communication system supporting a channel bonding technique.

Solution to Problem

In accordance with an aspect of the present invention, a data reception method of an electronic device in a wireless communication system supporting a channel bonding technique includes monitoring a predetermined band with a smallest bandwidth for receiving a preamble among a plurality of bands forming a total bandwidth and aggregable by the channel bonding technique; acquiring, when the preamble is received, information on data transmission bandwidth and switching interval duration from the preamble; switching from the band with the smallest bandwidth to a band with the data transmission bandwidth; and receiving data in the band with the data transmission bandwidth.

In accordance with another embodiment of the present invention, an electronic device for receiving data using a channel bonding technique includes a radio communication unit which transmits and receives signals in one of a plurality of bands forming a predetermined total bandwidth or total band; a modem which performs encoding and modulation on the signals to be transmitted and outputs the modulated signals to the radio communication unit and performs demodulation and decoding on the signals received from the radio communication unit; and a controller which monitors a predetermined band with a smallest bandwidth for receiving a preamble among a plurality of bands forming a total bandwidth and aggregable by the channel bonding technique, acquires, when the preamble is received, information on data transmission bandwidth and switching interval duration from the preamble, and controls the radio communication unit to switch from the band with the smallest bandwidth to a band with the data transmission bandwidth and receive data in the band with the data transmission information.

In accordance with another aspect of the present invention, a data transmission method of an electronic device in a wireless communication system supporting a channel bonding technique includes generating a preamble fit for being transmitted in a band with the smallest bandwidth among a plurality of bands forming a total bandwidth and aggregable by the channel bonding technique, transmitting duplicates of the preamble in all of the bands forming the total bandwidth, suspending transmission of data during a switching interval (SI) duration after transmitting the preamble across the total bandwidth, and transmitting the data in a predetermined band among the bands forming the total bandwidth upon expiry of the SI duration, wherein the preamble comprises fields for carrier sensing and common control information for data transmission and switching interval duration information.

In accordance with still another aspect of the present invention, an electronic device for transmitting data using a channel bonding technique includes a radio communication unit which transmits and receives signals in one of a plurality bands forming a predetermined total bandwidth or total band; a modem which performs encoding and modulation on the signals to be transmitted and outputs the modulated signals to the radio communication unit and performs demodulation and decoding on the signals received from the radio communication unit; and a controller which controls the radio communication unit to generate a preamble fit for being transmitted in a band with the smallest bandwidth among a plurality of bands forming a total bandwidth and aggregable by the channel bonding technique, transmit duplicates of the preamble in all of the bands forming the total bandwidth, suspend transmission of data during a switching interval (SI) duration after transmitting the preamble across the total bandwidth, and transmit the data in a predetermined band among the bands forming the total bandwidth upon expiry of the SI duration, wherein the preamble comprises fields for carrier sensing and common control information for data transmission and switching interval duration information.

Advantageous Effects of Invention

The present invention is advantageous in terms of reducing power consumption of a reception device in a wireless communication system supporting a channel bonding technique. Also, the present invention is advantageous in terms of increasing the usage time of a portable electronic device.

BRIEF DESCRIPTION OF DRAWINGS

FIGS. 5A to 5D are diagrams illustrating frame formats for use in a wireless communication system supporting channel bonding according to another embodiment of the present invention;

MODE FOR THE INVENTION

Exemplary embodiments of the present invention are described in detail with reference to the accompanying drawings. The same reference numbers are used throughout the drawings to refer to the same or like parts. It is noted that the accompanying drawings are provided to help understand the present invention, but they are not intended to limit the invention thereto. Detailed descriptions of well-known functions and structures incorporated herein may be omitted to avoid obscuring the subject matter of the present invention. It should be noted that the following description is made only of the parts necessary to help understand the operations according to various embodiments of the present invention and not of other parts to avoid obscuring the subject matter of the present invention.

Figure 1:
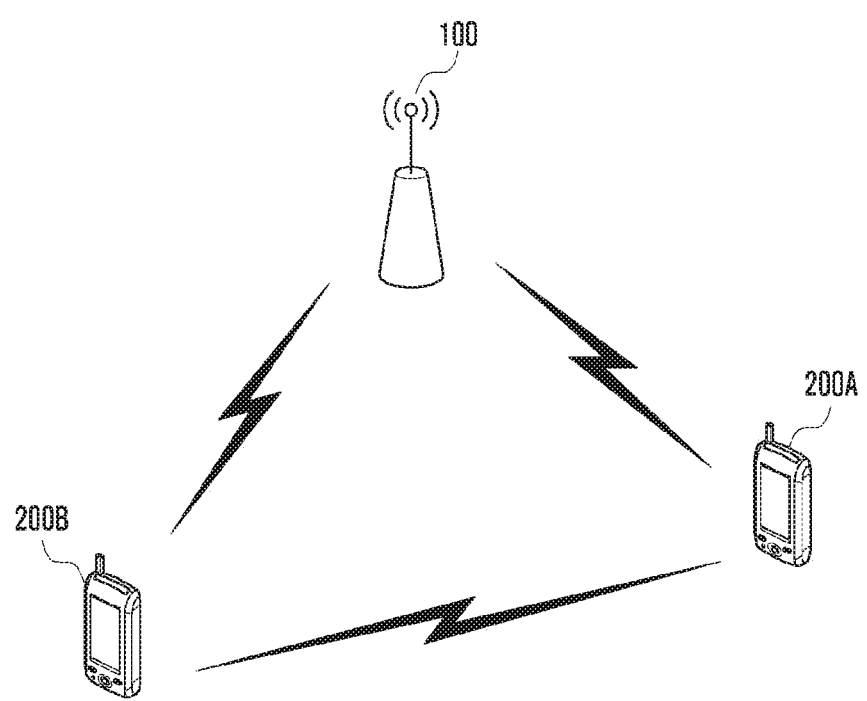
FIG. 1 is a conceptual diagram illustrating a wireless communication system to which the preset invention is applied.

FIG. 1 is a conceptual diagram illustrating a wireless communication system to which the preset invention is applied.

FIG. 1 depicts a situation where three network nodes 100, 200A, and 200B placed at certain distances are performing radio communication among each other. Among the three nodes, the first node 100 may be an access point (AP), and the second and third nodes 200A and 200B may be mobile nodes (e.g., smartphone, laptop computer, and tablet computer). It may also be possible that the first to third nodes 100, 200A, and 200B are all mobile nodes. In the following description, it is assumed that the first node 100 is an AP for convenience of explanation.

Also, it is assumed that the first to third nodes 100, 200A, and 200B support the channel bonding technique adopted in the wireless communication technology according to the present invention. Examples of the wireless communication standard adopting a channel bonding technique include IEEE 802.11ax or IEEE 802.11ay.

According to the aforementioned communication standard, the nodes 100, 200A, and 200B transmit and receive carrier sensing signals and common control signals for data communication. For example, the first node 100 may transmit a carrier sensing signal and a common control signal for notifying the neighboring nodes 200A and 200B of its presence and providing the neighboring nodes 200A and 200B with control information for common data transmission. It is assumed that the second node 200A receives the carrier sensing signal and common control signal transmitted by the first node 100.

The second node 200A checks the carrier sensing signal and common control signal transmitted by the first node 100 to identify the presence of the first node 100 and acquires capability information of the first node 100 from the control information for common data transmission.

Like the first node 100, the second node 200A may transmit a carrier sensing signal and a common control signal. Then, the first node 100 may receive the carrier sensing signal and common control signal transmitted by the second node 200A to identify the presence of the second node 200A and acquire control information for common data transmission.

The above description is directed to the operations of the first and second nodes 100 and 200A for mutual identification of their presence and common data transmission. The above-described operations may be performed between the first and third node 100 and 200B and between the second and third nodes 200A and 200B in the same manner.

Descriptions are made of the internal configurations of the first to third nodes 100, 200A, and 200B hereinafter.

Figure 2:
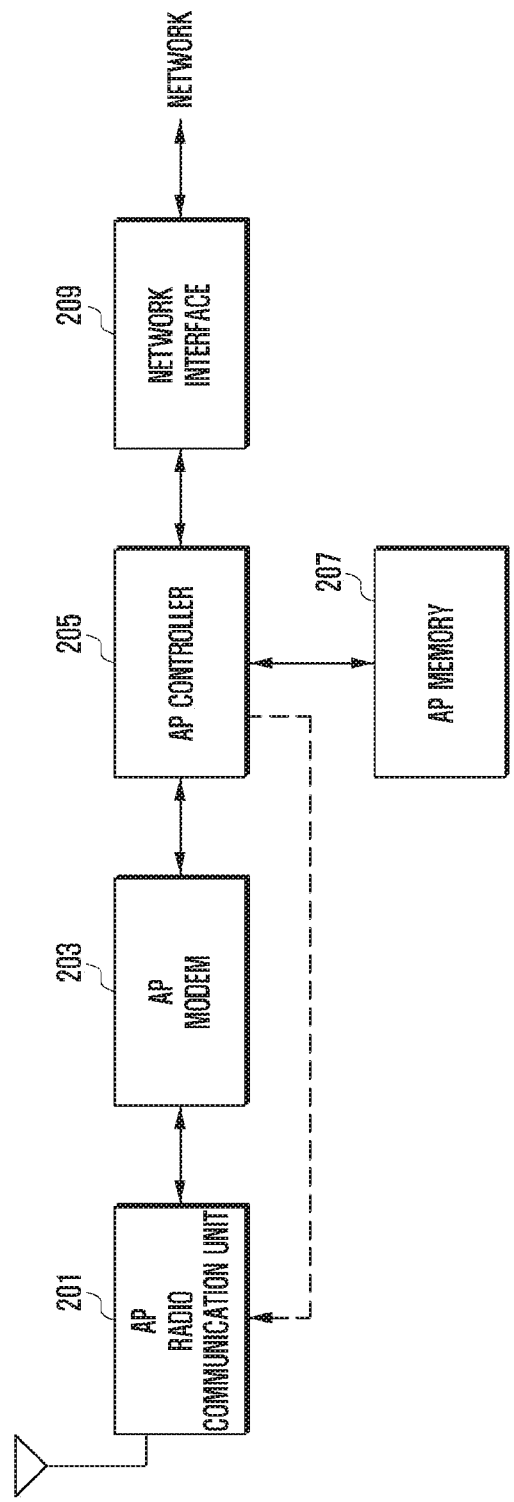
FIG. 2 is a block diagram illustrating an internal function configuration of the first node for reducing power consumption in an idle mode according to an embodiment of the present invention.

FIG. 2 is a block diagram illustrating an internal function configuration of the first node for reducing power consumption in an idle mode according to an embodiment of the present invention.

Figure 3:
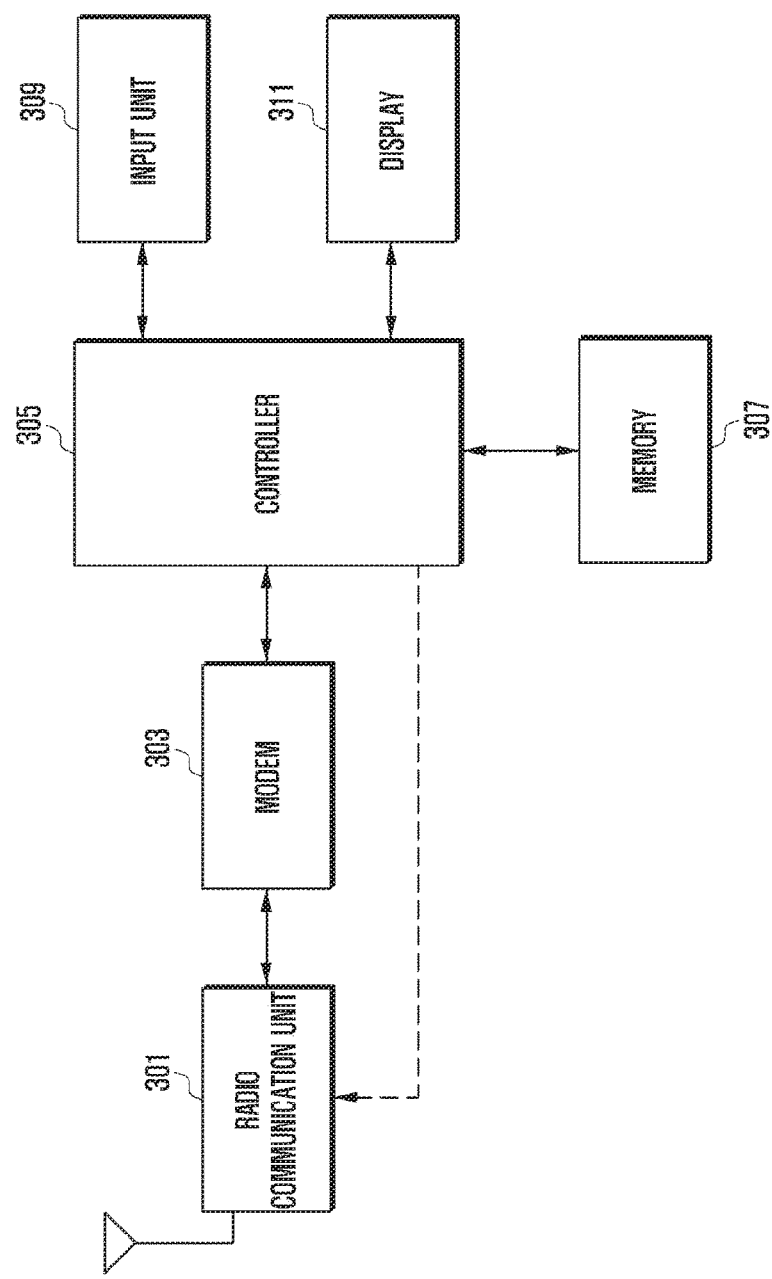
FIG. 3 is a block diagram illustrating an internal function configuration of the second node for reducing power consumption in an idle mode according to an embodiment of the present invention.

It should be noted that FIG. 2 depicts the configuration of the first node 100 as an AP. If the first node 100 is not an AP and just a mobile node, it may be configured as shown in FIG. 3.

The radio communication unit 201 up-converts a signal to a predetermined band signal and amplifies the up-converted signal to a desired output level for transmission through an antenna (ANT). The radio communication unit 201 may perform low noise amplification on a signal received by the antenna (ANT) and down-convert the amplified signal to a baseband signal for output to the modem 203.

The modem 203 performs coding and modulation on the signal to transmit and, if necessary, performs digital-to-analog conversion to generate an analog signal to the radio communication unit 201. The modem 203 may also perform demodulation and decoding on the data from the radio communication unit 201 and output the decoded signal to the controller 205. If necessary, the modem 203 may convert the analog signal from the radio communication unit 201 to a digital signal.

The controller 205 may control an overall operation in compliance with the wireless communication method supporting the channel bonding technique. According to an embodiment of the present invention, the controller 205 may control channel configuration for receiving data in such a way of turning on/off the radio communication unit 201 or switching between or combining two or more channels within a predetermined band. If the modem 203 is implemented in the form of a communication processor, the communication processor may control the operation of the radio communication unit 201. Since the drawing exemplifies the functional operations in the present invention, descriptions are made under the assumption that the controller 204 processes all control functions. In FIG. 2, the dotted line exemplifies a signaling path for controlling channel configuration for receiving data by switching between or combining two or more channels within a predetermined band as well as turning on/off the radio communication unit 201. The operations of the controller 205 according to the present invention are described later in more detail with reference to the accompanying drawings.

The memory 207 may store data generated as a result of control operations of the controller 205 and required for control operations of the controller 205. For example, the memory 207 may store various control data required for communication of the AP. The memory 207 may be implemented in various types such as, but not limited to, read only memory (ROM) and random-access memory (RAM).

The network interface 209 may be an interface for data communication of the AP through the Internet or a mobile communication network. Such network interface 209 is well-known in the art; thus, a detailed description thereof is omitted herein.

FIG. 3 is a block diagram illustrating an internal function configuration of the second node for reducing power consumption in an idle mode according to an embodiment of the present invention.

It should be noted that FIG. 3 depicts the configuration of the second node as a portable terminal carried by a user. The portable terminal carried by the user may be one of a smartphone, a handheld phone, a laptop computer, and a tablet computer as exemplified above.

The radio communication unit 301 up-converts a signal to a predetermined band signal and amplifies the up-converted signal to a desired output level for transmission through an antenna (ANT). The radio communication unit 301 may perform low noise amplification on a signal received by the antenna (ANT) and down-convert the amplified signal to a baseband signal for output to the modem 303. The radio communication unit 301 may be identical in configuration with the radio communication unit 201 of the AP that has been described above.

The modem 303 performs coding and modulation on the signal to transmit and, if necessary, performs digital-to-analog conversion to generate an analog signal to the radio communication unit 301. The modem 304 may also perform demodulation and decoding on the data from the radio communication unit 301 and output the decoded signal to the controller 305. If necessary, the modem 303 may convert the analog signal from the radio communication unit 301 to a digital signal. The modem 303 may be identical in configuration with the modem 203 of the AP that has been described above.

The controller 305 may control an overall operation of the terminal. According to an embodiment of the present invention, the controller 305 may control the channel bonding-based communication operation. According to an embodiment of the present invention, the controller 305 of the terminal may control channel configuration for receiving data in such a way of turning on/off the radio communication unit 301 or switching between or combining two or more channels within a predetermined band. If the modem 303 is implemented in the form of a communication processor, the communication processor may control the operation of the radio communication unit 301. Since the drawing exemplifies the functional operations in the present invention, descriptions are made under the assumption that the controller 305 processes all control functions. In FIG. 3, the dotted line exemplifies a signaling path for controlling channel configuration for receiving data by switching between or combining two or more channels within a predetermined band as well as turning on/off the radio communication unit 301. The operations of the controller 305 according to the present invention are described later in more detail with reference to the accompanying drawings.

The memory 307 may store data according to a need of the user and have a storage region for storing data required for control operations of the controller 305 and generated as a result of control operations of the controller 305. The memory 307 may be implemented in various types such as, but not limited to, ROM, RAM, hard disk, compact disk (CD), and digital video disk (DVD).

The input unit 309 is a means for receiving commands and data input by the user and may be implemented with at least one of a plurality of keys, a touchscreen, a voice recognition module, and a text recognition module.

The display 311 is a means for outputting a current state or operation state of the terminal and may be implemented with at least one of a liquid crystal display (LCD) panel, a light emitting diode (LED) panel, a speaker, and a vibration motor.

A description is made of the wireless communication method of the present invention based on the above description made with reference to FIGS. 1 to 3. Before undertaking the detailed description of the present invention below, it may be advantageous to set forth the operation modes of the electronic devices in the wireless communication system supporting the channel bonding technique. The electronic devices operating in the wireless communication system supporting the channel bonding technique may be in one of a sleep mode, an idle mode, and a transmission/reception (TRX) mode.

The sleep mode denotes a state in which the corresponding radio communication technique is not in use by the electronic device. For example, the Wi-Fi module of the electronic device may be turned off. In the embodiments of FIGS. 2 and 3, the radio communication units 201 and 301 and/or modems 203 and 303 are powered off.

The idle mode denotes a state of waiting for data transmission and reception. For example, the Wi-Fi module is in the state of being powered on to broadcast its own information for communication with other electronic devices or to receive signals broadcast by other electronic devices and determine whether there is data transmission or reception request. In the embodiments of FIGS. 2 and 3, the radio communication units 201 and 301 and/or modems 203 and 303 may be in the state of being powered on to perform carrier sensing as described with reference to FIG. 1, receive common control signals, and predict whether there is data transmission expected later.

Finally, the TRX mode denotes a state of exchanging data with other electronic devices using the corresponding wireless communication technology. In the embodiments of FIGS. 2 and 3, the radio communication units 201 and 301 and/or modems 203 and 303 may be in the state of being powered on to perform carrier sensing as described with reference to FIG. 1, receive common control signals, and transmit or receive data depending on necessity.

Among the three operation modes, the sleep mode is a state characterized by no power consumption or minimized power consumption. The TRX mode is a state characterized by consuming power unavoidably for transmitting or receiving data. However, the idle mode is likely to be the greatest portion of power consumption of the electronic device. This is because the reception module should be in the wakeup state for receiving signals transmitted by other electronic devices (i.e., performing carrier sensing and receiving common control signal and data and broadcasting its information periodically for notifying other electronic devices of its presence).

In this respect, the present invention proposes a method and apparatus for reducing power consumption in the idle mode.

Figure 4A:
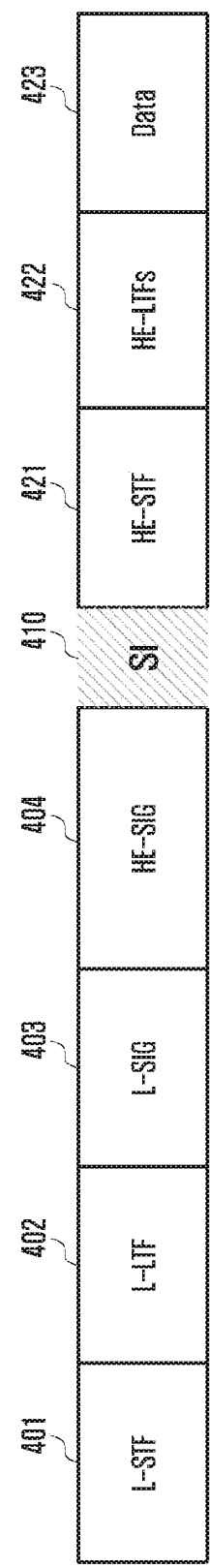
FIGS. 4A and 4B are diagrams illustrating frame formats for use in a wireless communication system supporting a channel bonding technique according to an embodiment of the present invention.
Figure 4B:
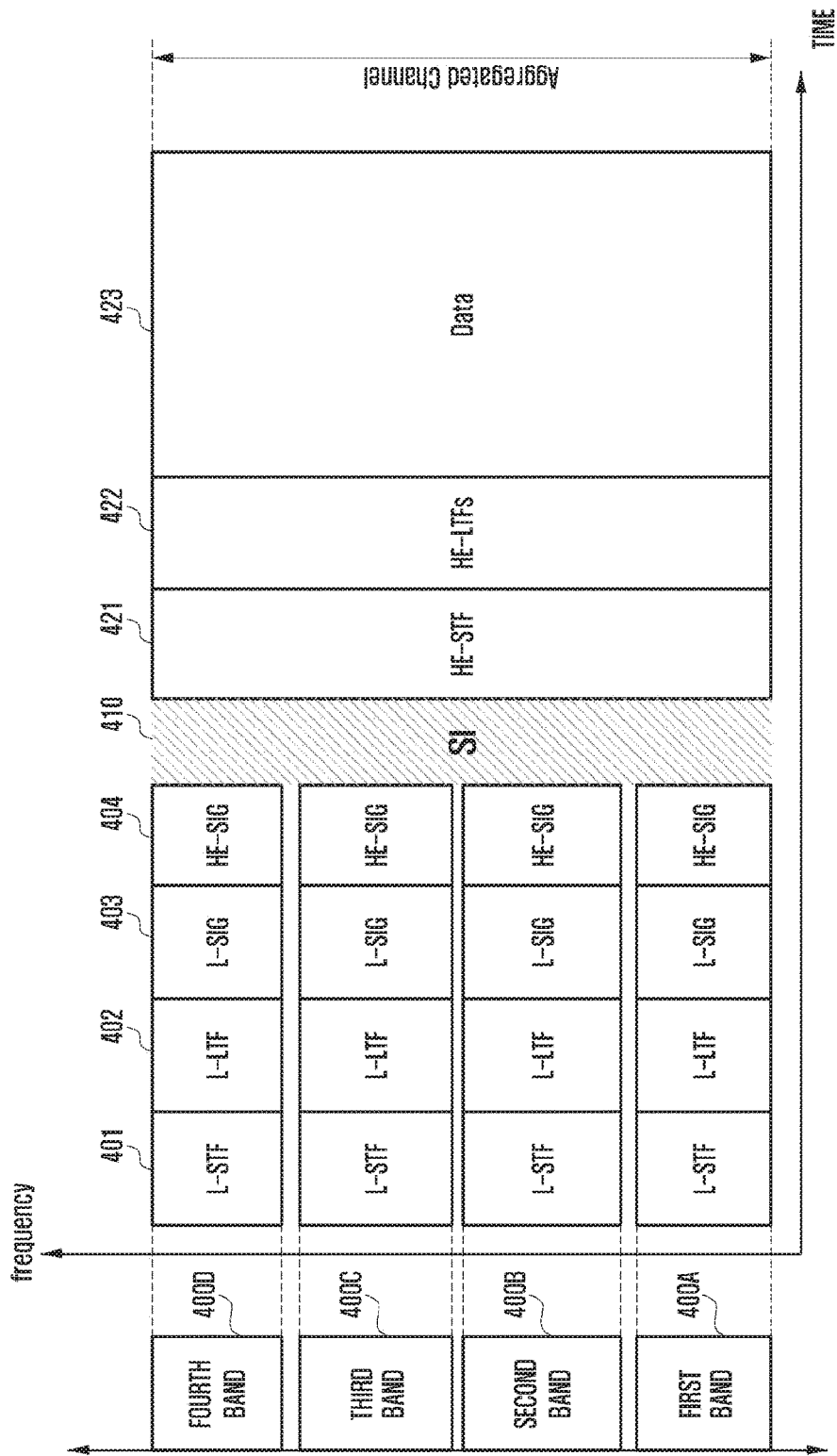

FIGS. 4A and 4B are diagrams illustrating frame formats for use in a wireless communication system supporting a channel bonding technique according to an embodiment of the present invention.

FIGS. 4A and 4B exemplify cases where the present invention is applied to the IEEE 802.11ax technology. FIG. 4A depicts a frame format for a case of using a single band for convenience of explanation, and FIG. 4B depicts a frame format for a case of combining multiple bands based on the frame format of FIG. 4A. The IEEE 802.11ax technology exemplified in FIGS. 4A and 4B uses a frame format including information fields for backward compatibility with the legacy radio communication scheme in the 2.4/5 GHz band without channel bonding and information fields for communication through channel bonding.

In FIGS. 4A and 4B, the frame format includes a legacy short training field (L-STF) 401, a legacy long training field (L-LTF) 402, a legacy signal field (L-SIG) 403, and a high efficiency-signal field (HE-SIG) 404 for backward compatibility with the legacy radio communication scheme. Among them, the L-STF 401, L-LTF 402, and L-SIG 403 are the fields for carrier sensing described above, and HE-SIG 404 is a field for transmitting a common control signal for data transmission (common information for data).

The frame format further includes a switching interval (SI) 401, which is followed by a high efficiency-short training field (HE-STF) 421, high efficiency-long training fields (HE-LTFs) 422, and data 423 in accordance with IEEE 802.11ax technology.

Detailed descriptions thereof are made with reference to FIG. 4B. FIG. 4B is a diagram exemplified to help understand the use of the channel bonding technique. In FIG. 4B, the horizontal axis is the time axis, and the vertical axis is the frequency axis. A first band 400A, a second band 400B, a third band 400C, and a fourth band 400D are arranged on the frequency axis.

The legacy systems use a single band. In the following description, it is assumed that the first band 400A is the single band in use by the legacy system. According to the communication standard supporting channel bonding, it is possible to transmit data in one or more bands. Transmitting data through two or more bands is called channel bonding. Even when transmitting data through a single band in the IEEE 802.11ax system, one of the first band 400A, the second band 400B, the third band 400C, and the fourth band 400D is used for the data transmission.

As shown in FIG. 4B, the L-STF 401, the L-LTF 402, the L-SIG 403, and the HE-SIG 404 provided for backward compatibility with the legacy radio communication scheme are duplicated so as to be transmitted in all bands.

In the present invention, the SI 410 is provided. A description is made of the reason for use of the SI 410 under the assumption of the network depicted in FIG. 1.

Suppose that all of the first to third nodes 100, 200A, and 200B are capable of transmitting and receiving data through channel bonding. Suppose that all of the first to third nodes 100, 200A, and 200B are in the idle mode. That is, the radio communication units 201 and 301 and the controllers 205 and 305 of FIGS. 2 and 3 are in the wakeup state. In this case, the radio communication units 201 and 301 set all of the first to fourth bands 400A, 400B, 400C, and 400D to a reception band and receive the L-STF 401, L-LTF 402, L-SIG 403, and HE-SIG 404.

If all of the bands are configured as a reception band to receive the L-STF 401, L-LTF 402, L-SIG 403, and HE-SIG 404, the radio communication units 201 and 301 and modems 203 and 303 of the nodes receive signals and perform demodulation/decoding on the received signals. This leads to excessive power consumption.

According to an embodiment of the present invention, each of the nodes 100, 200A, and 200B is configured to receive the L-STF 401, L-LTF 402, L-SIG 403, and HE-SIG 404 through a predetermined band. Since the duplicates of the L-STF 401, L-LTF 402, L-SIG 403, and HE-SIG 404 are transmitted through all of the bands, it is sufficient to receive the fields through one of the bands to acquire the necessary data. According to an embodiment of the present invention, each of the nodes 100, 200A, and 200B receives data through one of the bands 400A, 400B, 400C, and 400D rather than through all of them.

One of the simplest methods for selecting a band for receiving data is to configure the first band 400A, which is compatible with the legacy system, as the reception band. However, because each node may show reception performance degradation in a specific band, it may also be possible to select a best band among the bands 400A, 400B, 400C, and 400D and configure the selected band as the reception band. Using a specific band selected for receiving the fields conveying common control signals for carrier sensing and data transmission is possible because the same data are transmitted in all of the bands 400A, 400B, 400C, and 400D.

A description is made of the reason for introducing the SI 410 in the present invention. For example, if the first node 100 intends to transmit data to the second node 200A, it notifies the second node 200A of the band for use in transmitting data by means of the HE-SIG 404. If the first node 100 determines to transmit data through the first and second bands 400A and 400B bonded together, it may notify the second node 200A, by means of the HE-SIG 404 that the data will be transmitted through the first and second bands 400A and 400B in a channel bonding mode.

Then, the second node 200A checks the HE-SIG 404 to identify that the data is transmitted through the first and second bands 400A and 400B in the channel bonding mode. In this case, the second node 200A monitors one band to receive data through the bonded two bands. Here, the second node 200A as a receiver has to extend the reception band of the radio communication unit 301 by combining another band with the currently activated band. The SI 410 is inserted to secure spare time for this process in the present invention.

The information on the SI 410 may be indicated by the HE-SIG 404. That is, the HE-SIG 404 conveying the information necessary for data transmission may include information as follows accord to an embodiment of the present invention.

(1) Total bandwidth (BW) information
(2) Data bandwidth (BW) per node (BW per UE for OFDMA)
(3) SI duration The second node 200A may acquire the information on the total bandwidth, data bandwidth for the second node 200A, and SI duration from the HE-SIG 404 so as to receive data 423 being transmitted after the SI 410. The second node 200A may receive the data 423 based on the information included in the HE-STF 421 and HE-LTFs 422 according to the IEEE 802.11ax standard.

Although the description is directed to a case of the band extension being from one to two bands, it may also be possible to switch from one band to another band. Suppose that the first node 100 transmits data to the second node 200A and the second node 200A is monitoring the first band 400A to receive information for transmitting data to the second node 200A. In this case, the first node 100 may transmit data to the second node 200A through one of the second to fourth bands 400B, 400C, and 400D rather than the first band 400A. Even when a band is switched to another band in this way, the second node 200A has to receive the information fields carrying the information for carrier sensing and data transmission and perform band switching to receive data. In the case that the band switching is required for receiving data, the second node 200A performs band switching during the SI 410. Afterward, the data reception may be performed in the same way as that after channel bonding.

A description is made of the communication method in a wireless communication system according to another embodiment of the present invention with reference to the accompanying drawings.

FIGS. 5A to 5D are diagrams illustrating frame formats for use in a wireless communication system supporting channel bonding according to another embodiment of the present invention.

Figure 5A:
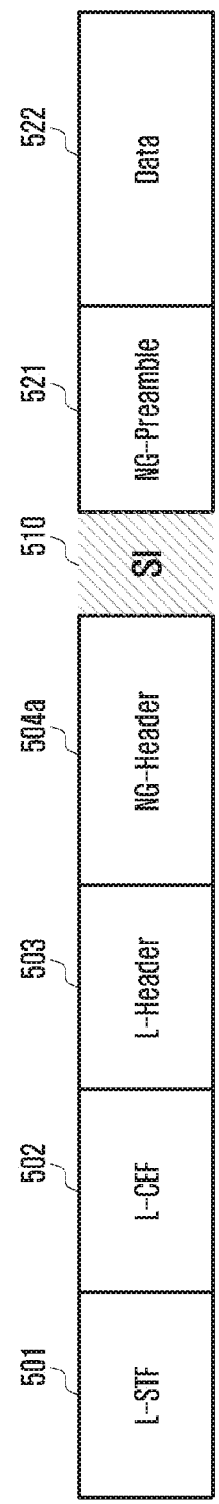
Figure 5B:
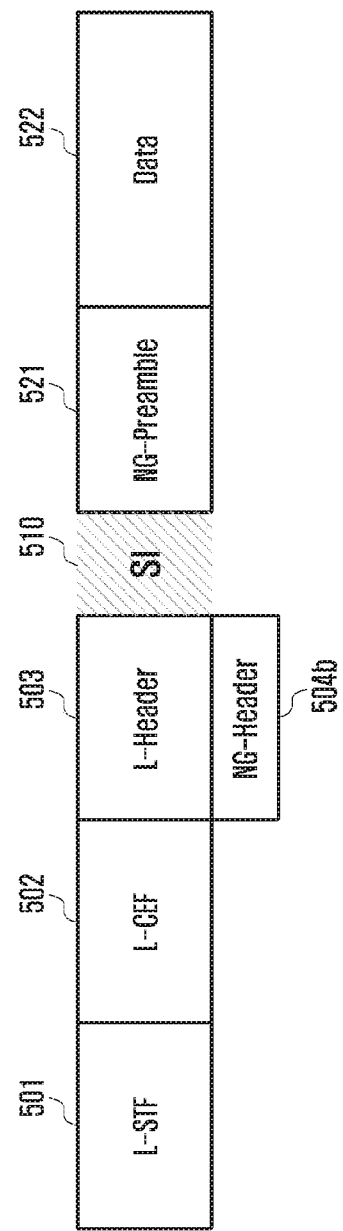
Figure 5C:
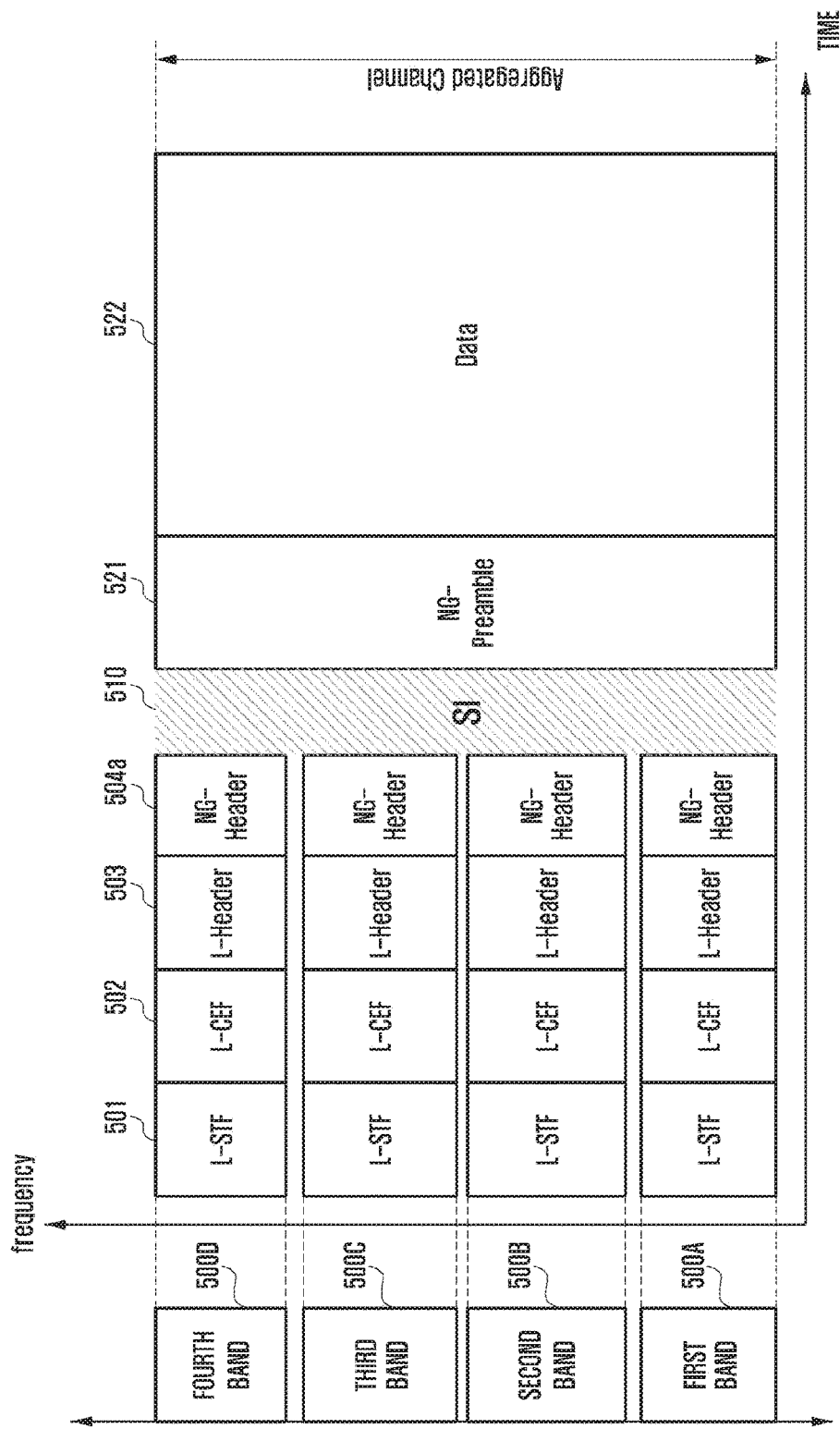

FIGS. 5A to 5D exemplify cases where the present invention is applied to IEEE 802.11ay technology. FIGS. 5A and 5B depict frame formats for cases of using a signal band for convenience of explanation like FIG. 4A. FIG. 5C depicts a frame format for a case of combining multiple bands based on the frame format of FIG. 5A, and FIG. 5D depicts a frame format for a case of combining multiple bands based on the frame format of FIG. 5B. FIGS. 5A to 5D exemplify the cases where the present invention is applied to the wireless communication system employing IEEE 802.11ay technology supporting channel bonding in the 60 GHz band.

In reference to FIG. 5A, the frame format is comprised of information fields for securing backward compatibility with the legacy radio communication scheme and information fields concerning data transmission.

As shown in FIG. 5A, the information fields for securing backward compatibility with the legacy radio communication scheme include a legacy short training field (L-STF) 501, a legacy channel estimation field (L-CEF) 502, a legacy header (L-Header) 503, and a new generation header (NG-Header) 504. FIG. 5A shows an exemplary frame format including the NG-header 504a in the form of a general field.

A description is made in detail of the exemplary case of using the fields shown in FIG. 5A with reference to FIG. 5C. FIG. 5C shows a channel configuration for the case of using the channel bonding technique based on the frame format of FIG. 5A.

In FIG. 5C, the horizontal axis is the time axis, and the vertical axis is the frequency axis as in FIG. 4B. A first band 500A, a second band 500B, a third band 500C, and a fourth band 500D are arranged on the frequency axis.

FIG. 5C shows a band for backward compatibility with a system in which the channel bonding technique and other bands can be aggregated according to the channel bonding technique. In the following description, it is assumed that the first band 500A is the signal band in use by the legacy system, which does not support the channel bonding technique. According to the communication standard supporting channel bonding, it is possible to transmit data in one or more bands. Transmitting data through two or more bands is called channel bonding. Even when transmitting data through a single band in the IEEE 802.11ay system, one of the first band 500A, the second band 500B, the third band 500C, and the fourth band 500D is used for the data transmission.

As shown in FIG. 5C, the L-STF 501, the L-CEF 502, the L-Header 503, and the NG-Header 504a provided for backward compatibility with the legacy radio communication scheme are duplicated so as to be transmitted in all bands. As described above, an SI 510 is introduced in the present invention. The reason for use of the SI 510 has been described in the embodiments of FIGS. 4A and 4B; therefore, a detailed description thereof is omitted herein.

As shown in FIG. 5C, an NG-Preamble 521 and data 522 may subsequently follow the SI 510. The data 522 are transmitted through an aggregated channel configured by combining two or more bands through channel bonding. In the case that the SI 510 is inserted, it is necessary to transmit the information on a switching interval and total bandwidth. Such information may be included in the NG-Header 504*a* conveying common control information for data transmission. The HG-Header 504*a* may include information as follows:

(1) Total bandwidth (BW) information
(2) SI duration

The common control signal for data transmission may include the NG-Preamble 521 and common control information for the data 522.

A description is made with reference to FIG. 5B. FIG. 5B is directed to a method of reducing overhead in comparison with FIG. 5A. The frame format of FIG. 5A includes the NG-Header 504*a* as an independent field. Meanwhile, the frame format of FIG. 5B is characterized in that the NG-Header 504 is transmitted in a guard band.

Typically, in the case where radio communication terminals transmit and receive data in data bands, a receiver may receive a signal in a guard band for receiving the data transmitted in the data band. Assuming that a band has a bandwidth of 20 MHz, the receiver has to have a reception bandwidth broader than 20 MHz to receive the intended signal correctly. If the reception bandwidth is broader than 20 MHz, this may cause receiving signals transmitted in a neighboring band; thus, it is necessary to adjust the frequency selectivity (sharpness). In this way, the receiver configured to receive signals in a predetermined band receives a certain signal even in the guard band. By taking notice of this, transmission of the HG-Header 504*b* in the guard band as shown in the embodiment of FIG. 5B is envisaged.

In the case of transmitting the NG-Header 504*b* in the guard band as shown in FIG. 5B, the NG-Header 504*b* may be transmitted during the time period of the L-Header 503. It may also be possible to adjust the length of the NG-Header 504*b* according to the capability and signal acquisition probability of the radio communication unit 301. It may also be possible to transmit the NB-Header 504*b* during the time period of the L-STF 501 or L-CEF 502 at a time or transmit the NB-Header 504*b* repetitively during the time period between the start time point of the L-STF 501 and the end time point of the L-Header 503 in the guard band.

In the case of transmitting the NG-Header 504*b* in the guard band as shown in FIG. 5B, it may be preferable to transmit information by means of a predetermined sequence rather than bit values with relatively large data amount. The information conveyed by the NG-Header 504*b* may include the Total BW and SI duration information described with reference to FIG. 5C. The Total BW and SI duration information may be transmitted in the form of a sequence mapped thereto. Accordingly, the receiver may acquire the total bandwidth and SI duration information from the sequence conveyed by the HG-Header 504*b*.

In the case of transmitting the NG-Header 504*b* in the guard band, the SI duration 510 follows the L-Header 503 as shown in FIG. 5B. In both the embodiments of 5A and 5B, the switching duration 510 is followed by an NG-Preamble 521 and data 522.

Next, a description is made in detail of the exemplary case of using the fields shown in FIG. 5B with reference to FIG. 5D. FIG. 5D shows a channel configuration for the case of using the channel bonding technique based on the frame format of FIG. 5B.

In FIG. 5D, the horizontal axis is the time axis, and the vertical axis is the frequency axis as in FIG. 5C. A first band 500A, a second band 500B, a third band 500C, and a fourth band 500D are arranged on the frequency axis.

FIG. 5D shows at least one band for backward compatibility with a system in which the channel bonding technique can not be used and other bands that can be aggregated according to the channel bonding technique. In the following description, it is assumed that the first band 500A is the signal band in use by the legacy system, which does not support the channel bonding technique. That is, the first band 500A is assumed as a band for securing backward compatibility with a node complying with a communication standard supporting one frequency band.

The first band 500A may be allocated to a node without the channel bonding capability or combined with other bands through the channel bonding technique. That is, a node may transmit data through a channel established by combining three bands (e.g., first band 500A, second band 500B, and third band 500*c*), two bands, or four bands through channel bonding. Although FIG. 5D depicts 4 bands, the number of bands can be increased or decreased according to the frequency spectrum of the system.

Even when transmitting data through a single band in the IEEE 802.11ay system as described above, one of the first band 500A, the second band 500B, the third band 500C, and the fourth band 500D is used for the data transmission.

As shown in FIG. 5D, the L-STF 501, the L-CEF 502, and the L-Header 503 provided for backward compatibility with the legacy radio communication scheme are arranged in data bands, and the NG-Header 504*b* is arranged in guard bands. Since the guard bands are provided between data bands within the total BW, the NG-Header 504*b* is located between the first and second bands 500A and 500B, between the second and third bands 500B and 500C, and between the third and fourth bands 500C and 500D.

As described above, the L-STF 501, the L-CEF 502, and the L-Header 503 are duplicated so as to be transmitted in all data bands, and the NG-Header 504*b* is also duplicated so as to be transmitted in all guard bands. It should be noted that the same reference number 504*b* is assigned to all NG-Header in FIG. 5D.

As described with reference to FIG. 5B, in the case where radio communication terminals transmit and receive data in a data band, a receiver may receive a signal in a guard band for receiving the data transmitted in the data band. Accordingly, it is not necessary for the receiver to adjust its reception band for receiving the NG-Header 504*b*. The HG-Header 504*b* may include information as described with reference to FIG. 5C.

As described above, an SI 501 is introduced in the present invention. The reason for use of the SI has been described in the embodiments of FIGS. 4A and 4B; therefore, a detailed description thereof is omitted herein.

As shown in FIG. 5D, an NG-Preamble 521 and data 522 may be transmitted subsequently after the SI 510. As described above, the data 522 may be transmitted through an aggregated channel configured by combining two or more bands through channel bonding.

Meanwhile, the nodes may have different capabilities. For example, the first node 100 may have a very fast switching capability, the second node 200A may have a switching capability slower than that of the first node 100, and the third node 200B may have a switching capability slower than that of the second node 200A. In the case that the nodes have different switching speed capabilities, it is inefficient to use the SI duration 410 and 510 determined based on the switching speed of one node. This is because if it is necessary to determine the SI duration based on one node the SI duration 410 and 510 should be determined to cover even the node with the slowest switching speed. Accordingly, it is preferable to determine the switching period 410 and 510 in consideration of the capabilities of the communication nodes.

In order to configure the SI duration in consideration of the respective nodes, it is necessary for the nodes to check their capabilities mutually. Accordingly, it is necessary to define an operation for the nodes to exchange bandwidth (BW) switch capability information. A description is made of the method for transmitting BW switch capability information according to the present invention.

In order to transmit the BW switch capability information, it may be considered to define a new frame or include the BW switch capability information in one of the legacy signals broadcast or transmitted by each node. A description is made of the legacy signals broadcast (advertised) by each node.

There is a beacon frame that is broadcast by each node without any specific destination. The beacon frame is a signal broadcast by a node (typically by an access point (AP)) at a regular interval to notify other nodes of its presence.

It may also be possible for a non-AP node to broadcast a probe request signal for discovering an AP. A node that has received a beacon signal may transmit a probe request signal to the AP which has transmitted the beacon signal. A node which has received the probe request signal may transmit a probe response signal such that their capabilities can be exchanged. In order to share the capability information, a certain node may transmit an information request signal to a target node, and the node that has received the information request signal may transmit an information response signal in response to the information request signal.

As described above, it may be possible to use the beacon signal, the probe request signal, the probe response signal, the information request signal, and the information response signal to transmit the BW switch capability information for configuring the SI duration 410 and 510 according to the present invention.

Figure 6:
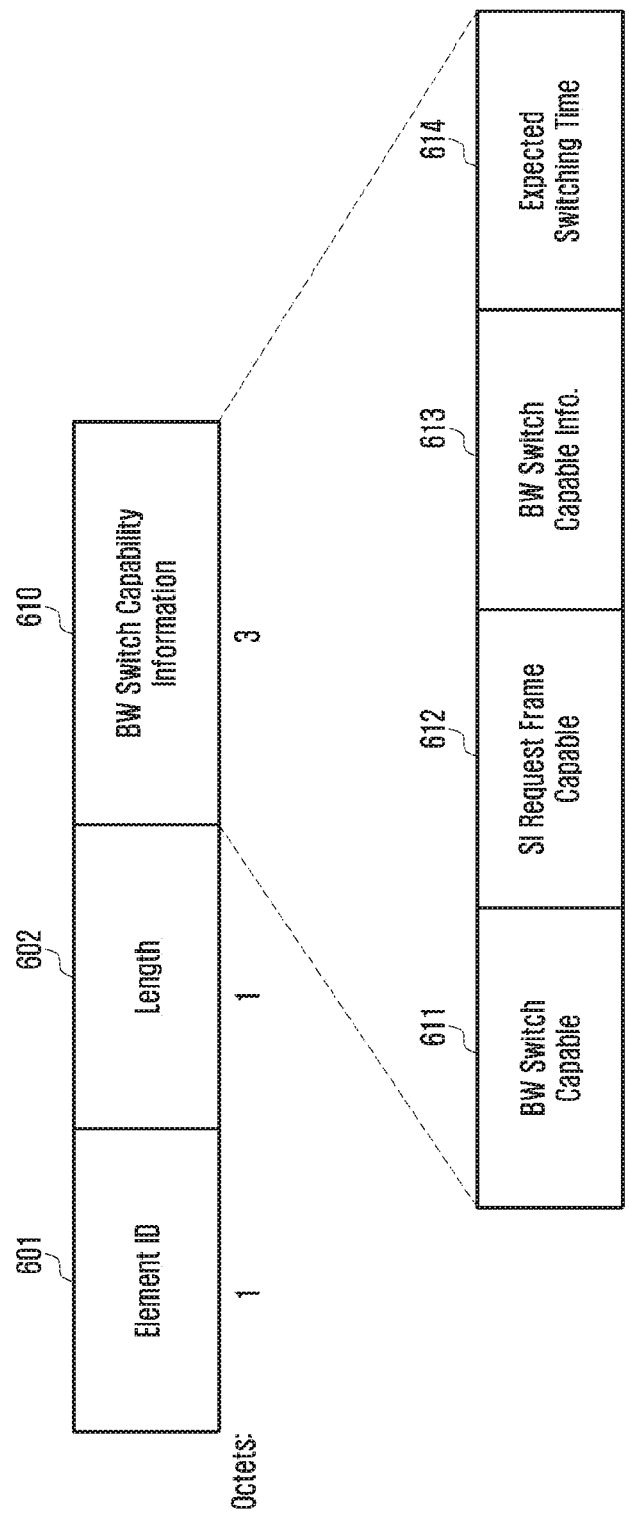
FIG. 6 is a diagram illustrating a broadcast signal format including BW switch capability information for use in a wireless communication system according to an embodiment of the present invention.

FIG. 6 is a diagram illustrating a broadcast signal format including BW switch capability information for use in a wireless communication system according to an embodiment of the present invention.

In reference to FIG. 6, the BW switch capability information may be comprised of 5 octets. The first octet contains an element ID 601, the second octet contains length information, and the 3 remaining octets contain the BW switch capability information 610.

The BW switch capability information 610 may include a BW switch capability subfield 611, an SI request frame capability subfield 612, a BW switch capability information subfield 613, and an expected switching time subfield 614. The subfields 611, 612, 613, and 614 are described in detail hereinafter.

The BW switch capability subfield 611 indicates whether the sender supports BW switching. For example, the BW switch capability subfield 611 is set to 0 indicative of incapability of BW switching or 1 indicative of capability of BW switching. The BW switch capability subfield 611 may be comprised of one or more bits. It may also be possible to configure such that the bit value is interpreted oppositely.

The SI request frame capability subfield 612 indicates whether the sender is capable of transmitting and receiving an SI request frame. The SI request frame capability subfield 612 is set to 0 indicative of incapability of transmitting and receiving the SI request frame or 1 indicative of capability of transmitting and receiving the SI request frame. The SI request frame capability subfield 612 may be comprised of one or more bits. It may also be possible to configure such that the bit value is interpreted oppositely.

The BW switch capability information subfield 613 conveys a BW list containing BWs available for BW switching. If there are four bands as shown in FIGS. 4B, 5C, and 5D, the bandwidth list may indicate the bandwidths available for BW switching using 4 bits. The number of bits may increase as the number of bands available for BW switching increases.

Finally, the expected switching time subfield 614 indicates BW switching duration per BW switching. The BW switching duration may be expressed in a unit of microseconds (us).

The above-described method makes it possible for the nodes to share their capability information mutually. The SI request frame capability subfield 612 conveys one of the aforementioned capability information items.

If it is possible to transmit the SI request frame, the node may transmit the SI request frame to configure or reconfigure the SI. A description is made of the configuration of the SW request frame hereinafter.

Figure 7:
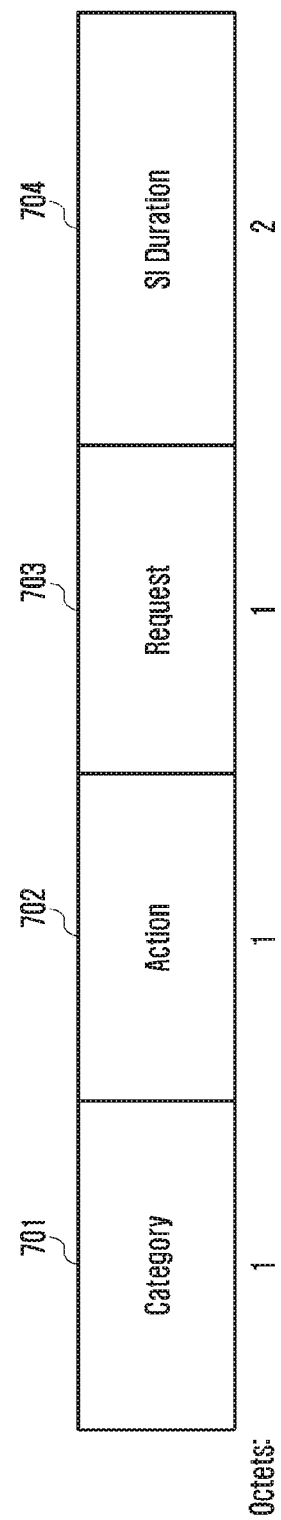
FIG. 7 is a diagram illustrating a configuration of an SI request frame according to an embodiment of the present invention.

FIG. 7 is a diagram illustrating a configuration of an SI request frame according to an embodiment of the present invention.

As shown in FIG. 7, the SI request frame may be comprised of 5 octets. As exemplified in FIG. 7, the first octet of the SI request frame may be designated as a category subfield 701, the second octet as an action subfield 702, the third octet as a request subfield 703, and the last 2 octets as an SI duration subfield 704. Here, the request subfield 703 conveys SI duration change request, and the SI duration subfield 704 conveys the SI duration value per bandwidth switching. The SI request frame may be an Action Frame for use in requesting for changing the SI duration to a specific value.

On the basis of the above descriptions, a power consumption reduction operation of a node in the idle mode is described hereinafter.

Figure 8:
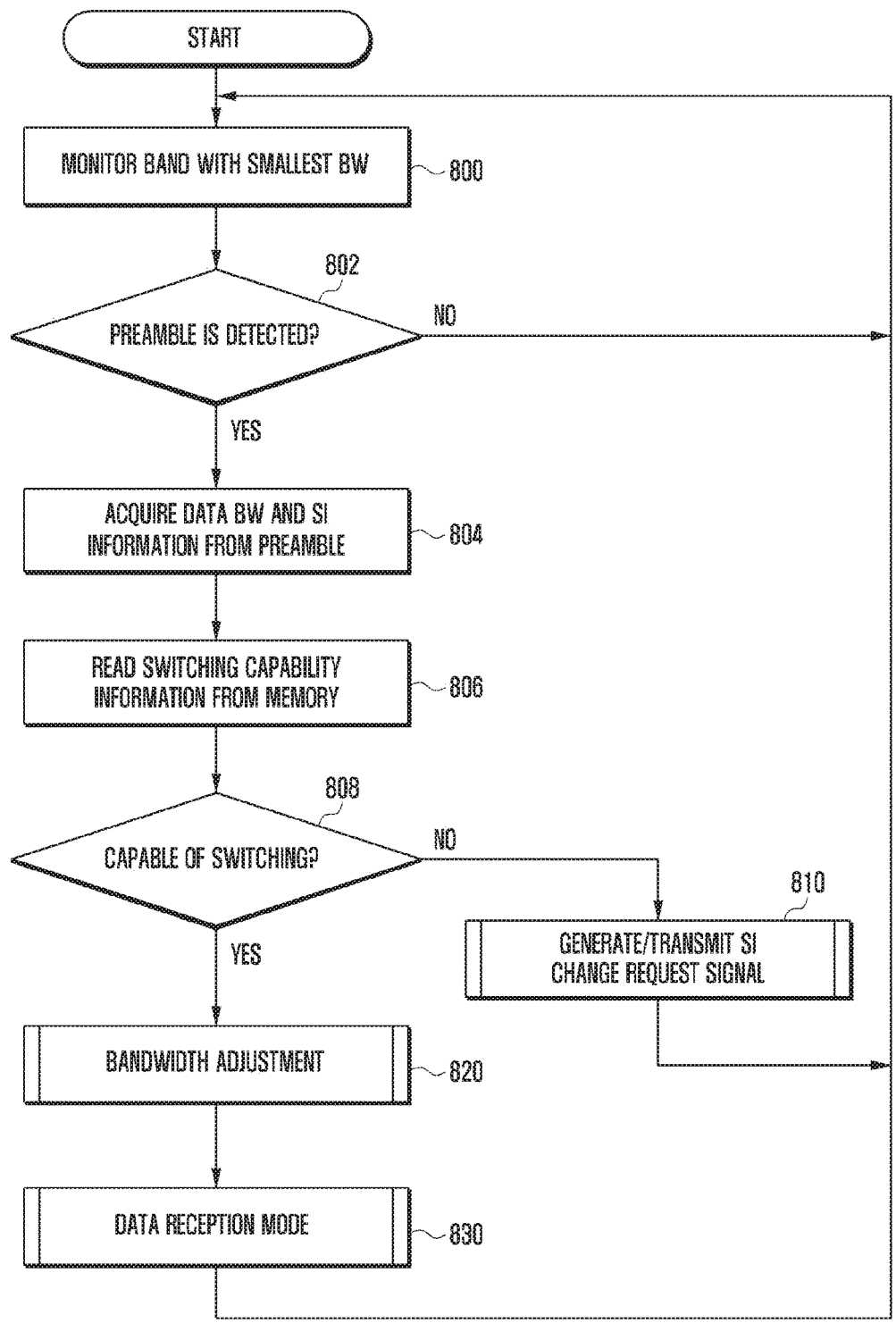
FIG. 8 is a flowchart illustrating a mode transition procedure of a node for transitioning from an idle mode to a data reception mode according to an embodiment of the present invention.

FIG. 8 is a flowchart illustrating a mode transition procedure of a node for transitioning from an idle mode to a data reception mode according to an embodiment of the present invention.

In FIG. 8, it is assumed that the node of which operation mode is transitioning from the idle mode to the data reception mode is the second node 200A of FIG. 1. Accordingly, the configuration of the second node 200A is described with the function blocks of FIG. 3. Also, it is assumed that the node which transmits data is the first node 100. Accordingly, the configuration of the first node 100 is described with the function blocks of FIG. 2. The description is made under the assumption that the above-described information of FIG. 6 has been transmitted.

The controller 305 of the terminal controls the radio communication unit 301 and the modem 303 to receive a signal in the smallest bandwidth (BW) at step 800. That is, the controller 305 monitors only a band with the smallest bandwidth. The band with the smallest bandwidth may be the first band 400A of FIG. 4B or the first band 500A of FIG. 5C or 5D. In the present invention, the band with the smallest bandwidth may denote a single band for wholly receiving the information fields for carrier sensing and the information fields for common control information concerning data transmission.

At step 800, the controller 305 monitors the band with the smallest bandwidth to determine at step 802 whether a preamble is received. Here, the preamble differs in meaning from the preamble depicted in FIGS. 5A to 5D. At step 802, the term "preamble" is intended to include the fields for carrier sensing and the fields containing common control information for data transmission.

If it is determined at step 802 that a preamble is received, the procedure goes to step 804; if it is determined that a preamble is not received, the procedure returns to step 800. If it is determined at step 802 that a preamble is received, the controller 305 controls the radio communication unit 301 and the modem 303 to perform down-conversion, demodulation, and decoding on the preamble to receive the information required for receiving data from the information fields of the preamble at step 804.

The information required for receiving data may include data transmission bandwidth information and SI information. Such information may be conveyed in the HE-SIG 404, NG-Header 504a and 504b, or L-Header 503, depending on system configuration. The controller 305 may control the radio communication unit 301 and the modem 303 to receive data transmitted through a predetermined band based on the information required for receiving the data.

If the information required for receiving data is acquired, the controller 305 reads its switching time capability information from the memory 307 at step 806. Afterward, the controller 305 compares the SI duration information included in the information required for receiving data with its switching time capability information at step 808. Though this comparison, the controller 305 determines at step 808 whether the radio communication unit 301 is capable of switching to receive data within the SI duration. That is, assuming that the SI duration information transmitted by the first node 100 is a required SI and the switching time capability of the second node 200A is an SI capability, the controller 305 determines whether the SI indicated by the SI capability is equal to or faster than the required SI. If the SI indicated by the SI capability is equal to or faster than the required SI, the procedure goes to step 820; if the SI indicated by the SI capability is not equal to or shorter than the required SI, the procedure goes to step 810.

A description is made of the case where the procedure goes to step 810. If it is determined at step 808 that the SI indicated by the SI capability of the second node 200A is slower than the required SI, the controller 305 generates and transmits an SI change request signal to the first node 100 at step 810. The SI change request signal may be transmitted by means of the SI request frame of FIG. 7. As described above, the SI request frame may be transmitted when the information on the nodes, as shown in FIG. 6, has been received in advance. The SI request frame of FIG. 7 may be transmitted only when the SI request frame capability subfield 612 included in the BW switch capability information 610 is set to a value indicating "capable" as described with reference to FIG. 6.

If the procedure goes to step 810, this means that the second node 200A cannot receive data normally with its switching capability and thus may request for increase of the SI duration. Through this step, the second node 200A may receive data transmitted by the first node 100 normally using the increased SI duration.

A description is made of the case where the node is capable of switching, i.e., the procedure progresses from step 808 to step 820. At step 820, the controller 305 may adjust bandwidth for receiving data based on the data bandwidth (BW) acquired from the preamble. The bandwidth adjustment may be performed as follows:

First, extending the current bandwidth of the reception band and switching to the band with the extended bandwidth Second, maintaining the current bandwidth but switching to another band Third, reducing the current bandwidth of the reception band and switching to the band with the reduced bandwidth The first situation is the case of receiving data initially. The second situation is the case where a preamble is received in the first band and data are received in another band, i.e., second band, third band, or fourth band. The third situation is the case where data are received in a band narrower than the band in which the fields for carrier sensing and the fields containing control information for data transmission are conveyed, In the case corresponding to the third situation, it may be possible to receive data without switching, if necessary. The controller 305 may control the radio communication unit 301 to adjust the reception bandwidth and then enter the data reception mode at step 830. The data reception mode may denote the operation mode for receiving data in the reception band.

Figure 9:
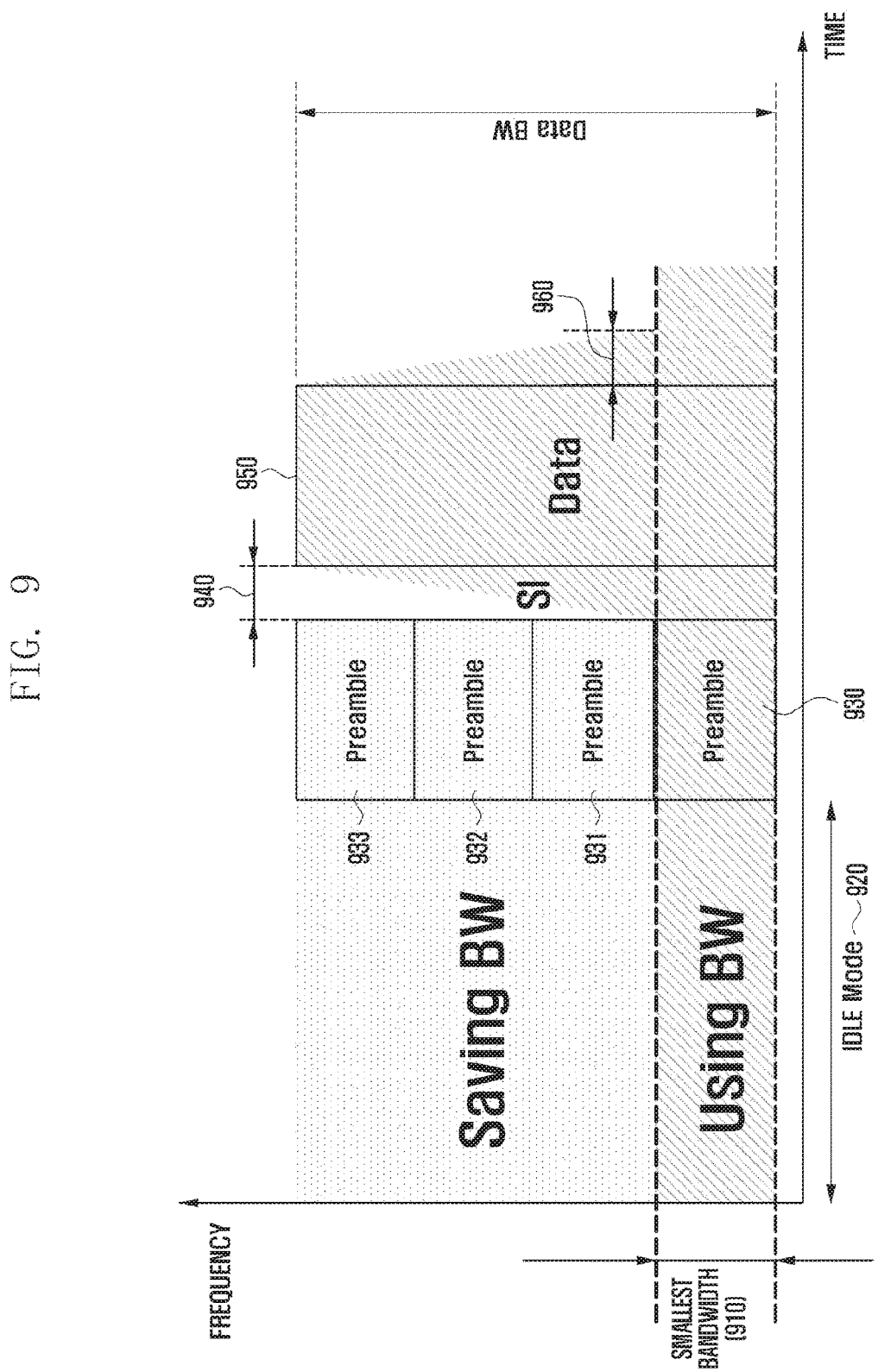
FIG. 9 is a conceptual diagram illustrating a structure of a frame for explaining a situation of bandwidth extension for receiving data in the course of monitoring the smallest bandwidth.

A description is made of the bandwidth adjustment with reference to FIG. 9. FIG. 9 is a conceptual diagram illustrating a structure of a frame for explaining a situation of bandwidth extension for receiving data in the course of monitoring a smallest bandwidth.

A description is made with FIG. 9 under the assumption that the first node 100 of FIG. 1 transmits a preamble 930 and data 950 and the second node 200A or the third node 200B receives the preamble 930 through a smallest bandwidth 910. In the following description, the explanation is made in view of the operation of the second node 200A for convenience of explanation.

In reference to FIG. 9, the second node 200A in the idle state, as denoted by reference number 920, receives data through the smallest bandwidth 910. The description on the smallest bandwidth 910 has been described above and thus is omitted herein. The second node 200a may monitor the narrowest band 910 for receiving the preamble 930. As described above, the preamble is intended to include the fields for carrier sensing and the fields containing common control information for data transmission.

As described above, the preamble is duplicated so as to be transmitted through all of the narrowest bands 910; thus, the second node 200A may acquire the information concerning carrier sensing and common control information for data transmission through even the smallest bandwidth 910. If the preamble is received, the second node 200A may acquire the information on the total bandwidth, per-node data bandwidth, and SI duration from the preamble.

In FIG. 9, it is assumed that the second node 200A is capable of switching in the SI duration notified by the first node 100. Accordingly, the second node 200A performs switching for extending bandwidth, changing band, or maintaining band within the SI duration 940. Afterward, the second node 200A may receive data through the data transmission bandwidth as denoted by reference number 950. If the data reception is completed, the second node 200A may perform switching for recovering the smallest bandwidth during a predetermined period 960, which is set to a length equal or similar to the SI duration.

As exemplified in FIG. 9, the nodes supporting channel bonding are operating in the idle mode for a long time. If a node in the idle mode monitors all channel bonding available bands for receiving the preamble, this increases its power consumption. The present invention is advantageous in terms of reducing the power consumption of each node dramatically by allowing the node to monitor one narrowest band for receiving a preamble. Accordingly, the portable terminal equipped with the function proposed in the present invention is capable of saving power, resulting in extension of usage time of the portable terminal.

A description is made of the operation of a transmission node with reference to FIG. 9. The description is made under the assumption that the transmission node is the first node 100 of FIG. 1 that is configured as shown in FIG. 2.

If there is no need to transmit data, the controller 205 of the AP turns off the radio communication unit 201 and the modem 203 of the AP. That is, the AP stays in the state of not transmitting any signal. However, the controller 205 may turn on the radio communication unit 201 and the modem 203 to transmit a beacon signal periodically in order to announce its presence.

If it becomes necessary to transmit data, the controller 205 wakes up the AP from the idle mode 920 to generate and broadcast the preamble 930. As described above, the preamble includes the fields for carrier sensing and the fields containing common control information for data transmission. The controller 205 broadcasts the preamble across the total bandwidth rather than through the smallest bandwidth 910. Here, the controller 205 controls the modem 203 and the radio communication unit 201 to duplicate the preamble transmitted through the smallest bandwidth 910 and broadcast the duplicates in other bands. That is, the controller 205 controls the modem 203 and the radio communication unit 201 to transmit the duplicates of the preamble across the total bandwidth (BW) available for data transmission. The reason for transmitting the duplicates of the preamble across the total bandwidth is that the nodes without the capability proposed in the present invention have to receive the preamble too. Although FIG. 9 depicts that the preamble is received in the lowest frequency band with the smallest bandwidth 910, it may also be possible that the preamble may be received through one of other frequency bands rather than the lowest frequency band. For example, a certain reception node may receive the preamble through one of different frequency bands with the smallest bandwidth as denoted by reference number 931, 932, and 933. It may also be considered that there are reception nodes capable of receiving data across all available bands. Accordingly, the controller 205 controls the transmission node to transmit the preamble across all available bands.

As described above, the controller 205 may transmit the SI duration information in the fields conveying the common control information for data transmission. After transmitting the preamble, the controller 205 controls the modem 203 and the radio communication unit 201 to wait until the SI duration 940 expires and then transmits data in the predetermined band. Although FIG. 9 depicts that data are transmitted across the entire band, it may also be possible to transmit data through part of the entire band. That is, as a reception node performs bandwidth switching as described above, the transmission node may transmit data through one band with the smallest bandwidth, an extended band configured through channel bonding of two or more bands, or a channel narrower than the smallest bandwidth. In the case of transmitting data through a band with the smallest bandwidth, the controller 205 may select the lowest frequency band 910 as exemplified in FIG. 9 or one of other frequency bands for the data transmission, as denoted by reference numbers 931, 932, and 933.

The present invention is capable of reducing power consumption of the reception node in the idle mode by transmitting data as described above. If it is agreed for the transmission node to transmit the preamble through a predetermined band with the smallest bandwidth, it may also be possible to save the preamble transmission power of the transmission node.

Meanwhile, if an SI change request frame is received from the reception node after transmitting data, the controller 205 changes the SI duration based on the information contained in the SI change request frame. Afterward, the controller 205 may control the transmission node to generate the preamble including the changed SI duration information and transmit the preamble and data as described above.

Although various embodiments of the present disclosure have been described using specific terms, the specification and drawings are to be regarded in an illustrative rather than a restrictive sense in order to help understand the present invention. Thus, the scope of the invention should be determined by the appended claims and their legal equivalents rather than the specification, and various alterations and modifications within the definition and scope of the claims are included in the claims.

INDUSTRIAL APPLICABILITY

The present invention is applicable to wireless communication devices for reducing power consumption in the idle mode.

The invention claimed is:

1. A data reception method of an electronic device in a wireless communication system supporting a channel bonding technique, the method comprising:
monitoring a predetermined band with a smallest bandwidth for receiving a preamble among a plurality of bands forming a total bandwidth and aggregable by the channel bonding technique;
acquiring, when the preamble is received, information on data transmission bandwidth and switching interval duration from the preamble;
switching from the band with the smallest bandwidth to a band with the data transmission bandwidth; and
receiving data in the band with the data transmission bandwidth.

2. The method of claim 1, further comprising:
determining whether the electronic device is capable of switching in the switching interval duration; and
requesting, when the electronic device is incapable of switching in the switching interval duration, for changing the switching interval duration.

3. The method of claim 1, wherein switching from the band with the smallest bandwidth to the band with the data transmission bandwidth is one of switching from the band with the smallest bandwidth to another band with the smallest bandwidth, switching from the band with the smallest bandwidth to a band with an extended bandwidth, switching from the band with the smallest bandwidth to a band with a bandwidth narrower than the smallest bandwidth, and maintaining the band with the smallest bandwidth.

4. The method of claim 1, further comprising;
switching, after receiving data through the data transmission bandwidth, back to the band with the smallest bandwidth; and
monitoring the band for receiving the preamble.

5. The method of claim 1, wherein the preamble comprises a field for carrier sensing and a common control information field for data transmission.

6. An electronic device for receiving data using a channel bonding technique, the electronic device comprising:
a radio communication unit which transmits and receives signals in one of a plurality of bands forming a predetermined total bandwidth or total band;
a modem which performs encoding and modulation on the signals to be transmitted, outputs the modulated signals to the radio communication unit, and performs demodulation and decoding on the signals received from the radio communication unit; and
a controller which monitors a predetermined band with a smallest bandwidth for receiving a preamble among a plurality of bands forming a total bandwidth and aggregable by the channel bonding technique, acquires, when the preamble is received, information on data transmission bandwidth and switching interval duration from the preamble, and controls the radio communication unit to switch from the band with the smallest bandwidth to a band with the data transmission bandwidth and receive data in the band with the data transmission bandwidth.

7. The electronic device of claim 6, wherein the controller determines whether the electronic device is capable of switching in the switching interval duration and controls, when the electronic device is incapable of switching in the switching interval duration, the modem and the radio communication unit to generate and transmit a switching interval duration change request frame.

8. The electronic device of claim 6, wherein the controller controls the radio communication unit to switch from the band with the smallest bandwidth to another band with the smallest bandwidth, from the band with the smallest bandwidth to a band with an extended bandwidth, or from the band with the smallest bandwidth to a band with a bandwidth narrower than the smallest bandwidth, or maintain the band with the smallest bandwidth.

9. The electronic device of claim 6, wherein the controller controls the radio communication unit to switch, after receiving data through the data transmission bandwidth, back to the band with the smallest bandwidth and monitor the band for receiving the preamble.

10. The electronic device of claim 6, wherein the preamble comprises a field for carrier sensing and a common control information field for data transmission.

11. A data transmission method of an electronic device in a wireless communication system supporting a channel bonding technique, the method comprising:
generating a preamble fit for being transmitted in a band with the smallest bandwidth among a plurality of bands forming a total bandwidth and aggregable by the channel bonding technique;
transmitting duplicates of the preamble in all of the bands forming the total bandwidth;
suspending transmission of data during a switching interval (SI) duration after transmitting the preamble across the total bandwidth; and
transmitting the data in a predetermined band among the bands forming the total bandwidth upon expiry of the SI duration,
wherein the preamble comprises fields for carrier sensing and common control information for data transmission and switching interval duration information.

12. The method of claim 11, further comprising:
regenerating, when an SI duration change request signal is received from a reception node, the preamble by resetting the SI duration to the received SI duration;
transmitting duplicates of the regenerated preamble in all of the bands forming the total bandwidth;
suspending transmission of data for the reset SI duration after transmitting the regenerated preamble; and
transmitting the data in the predetermined band among the bands forming the total bandwidth.

13. The method of claim 11, wherein the SI duration information is included in the common control information for data transmission.

14. The method of claim 11, wherein the SI duration information is transmitted in a guard band between bands with the smallest bandwidth.

15. The method of claim 14, wherein the SI duration information is transmitted in the form of a sequence agreed in advance.

16. An electronic device for transmitting data using a channel bonding technique, the electronic device comprising:
a radio communication unit which transmits and receives signals in one of a plurality bands forming a predetermined total bandwidth or total band;
a modem which performs encoding and modulation on the signals to be transmitted, outputs the modulated signals to the radio communication unit, and performs demodulation and decoding on the signals received from the radio communication unit; and
a controller which controls the radio communication unit to generate a preamble fit for being transmitted in a band with the smallest bandwidth among a plurality of bands forming a total bandwidth and aggregable by the channel bonding technique, transmit duplicates of the preamble in all of the bands forming the total bandwidth, suspend transmission of data during a switching interval (SI) duration after transmitting the preamble across the total bandwidth, and transmit the data in a predetermined band among the bands forming the total bandwidth upon expiry of the SI duration,
wherein the preamble comprises fields for carrier sensing and common control information for data transmission and switching interval duration information.

17. The electronic device of claim 16, wherein the controller controls the radio communication unit to regenerate, when an SI duration change request signal is received from a reception node, the preamble by resetting the SI duration to the received SI duration, transmit duplicates of the regenerated preamble in all of the bands forming the total bandwidth, suspend transmission of data for the reset SI duration after transmitting the regenerated preamble, and transmit the data in the predetermined band among the bands forming the total bandwidth.

18. The electronic device of claim 16, wherein the SI duration information is included in the common control information for data transmission.

19. The electronic device of claim 16, wherein the SI duration information is transmitted in a guard band between bands with the smallest bandwidth.

20. The electronic device of claim 19, wherein the SI duration information is transmitted in the form of a sequence agreed in advance.

* * * * *